United States Patent
Chao et al.

(10) Patent No.: US 8,090,211 B2
(45) Date of Patent: Jan. 3, 2012

(54) DEVICE FOR REDUCING IMPULSE NOISE AND METHOD THEREOF

(75) Inventors: Po-Wei Chao, Taipei Hsien (TW); Hsin-Ying Ou, Hsin-Chu (TW)

(73) Assignee: Realtek Semiconductor Corp., Hsinchu (TW)

( * ) Notice: Subject to any disclaimer, the term of this patent is extended or adjusted under 35 U.S.C. 154(b) by 1032 days.

(21) Appl. No.: 11/746,652

(22) Filed: May 10, 2007

(65) Prior Publication Data

US 2007/0263940 A1 Nov. 15, 2007

(30) Foreign Application Priority Data

May 12, 2006 (TW) .............................. 95116898 A (51) Int. Cl.
*G06K 9/40* (2006.01)
(52) U.S. Cl. ......... 382/260; 382/261; 382/274; 382/275
(58) Field of Classification Search .................. 382/275, 382/260, 264
See application file for complete search history.

(56) References Cited

U.S. PATENT DOCUMENTS

| | | | | |
|---|---|---|---|---|
| 5,959,693 | A * | 9/1999 | Wu et al. ....................... | 348/624 |
| 6,137,917 | A | 10/2000 | Park | |
| 6,244,514 | B1 * | 6/2001 | Otto ............................ | 235/492 |
| 6,385,261 | B1 | 5/2002 | Tsuji et al. | |
| 6,453,272 | B1 | 9/2002 | Slechta | |
| 7,031,546 | B2 * | 4/2006 | Maeda et al. ................. | 382/260 |
| 7,463,771 | B2 * | 12/2008 | Chen et al. .................... | 382/170 |
| 7,573,959 | B2 * | 8/2009 | Hsiung et al. ................. | 375/346 |
| 7,729,555 | B2 * | 6/2010 | Chen et al. .................... | 382/261 |
| 2009/0033773 | A1 * | 2/2009 | Kinoshita et al. ............. | 348/241 |

FOREIGN PATENT DOCUMENTS

| | | |
|---|---|---|
| JP | 61180166 | 8/1986 |
| JP | 11317943 | 11/1999 |
| JP | 200050109 | 2/2000 |

OTHER PUBLICATIONS

Yung et al. "Novel filter algorithm for removing impulse noise in digital images" Visual Communicaitons and image processing, Taipei, Taiwan, May 1995, pp. 210-220.*
Han et al. "Minimum-maximum exclusive mean (MMEM) filter to remove impulse noise from highly corrupted images" Electronics Letter, 1997, vol. 33 No. 2, pp. 124-125.*
Pok et al. "Selective removal of impulse noise based on homogeneity level information" IEEE Transactions on Image Processing, 2003, vol. 12 No. 1, pp. 85-92.*
Alajlan et al. "Detail preserving impulse noise removal" Signal Processing Image Communication, 2004, pp. 993-1003.*
Eng et al. "Noise Adaptive Soft-Switching Median Filter" IEEE Tansactions on Image Processing, vol. 10, No. 2, Feb. 2001.*

* cited by examiner

*Primary Examiner* — Brian Werner
*Assistant Examiner* — Utpal Shah
(74) *Attorney, Agent, or Firm* — Thomas, Kayden, Horstemeyer & Risley, LLP (57) ABSTRACT

The present invention provides a device and a method for reducing impulse noise. The device includes a signal intensity detector, an intensity difference calculator, and a filtering circuit. The signal intensity detector receives an image signal and determines a first pixel having an extreme intensity, and a second pixel having a second extreme intensity of a window of the image frame corresponding to the image signal. The intensity difference calculator determines the intensity difference between the first pixel and the second pixel. The filtering circuit receives the image signal and optionally filters the image signal for reducing the impulse noise according to the intensity difference between the first pixel and the second pixel.

21 Claims, 12 Drawing Sheets

DEVICE FOR REDUCING IMPULSE NOISE AND METHOD THEREOF

BACKGROUND OF THE INVENTION

1. Field of the Invention

The present invention relates to a method for image processing, and more particularly, to a method for reducing impulse noise and the apparatus thereof.

2. Description of the Prior Art

Figure 1:
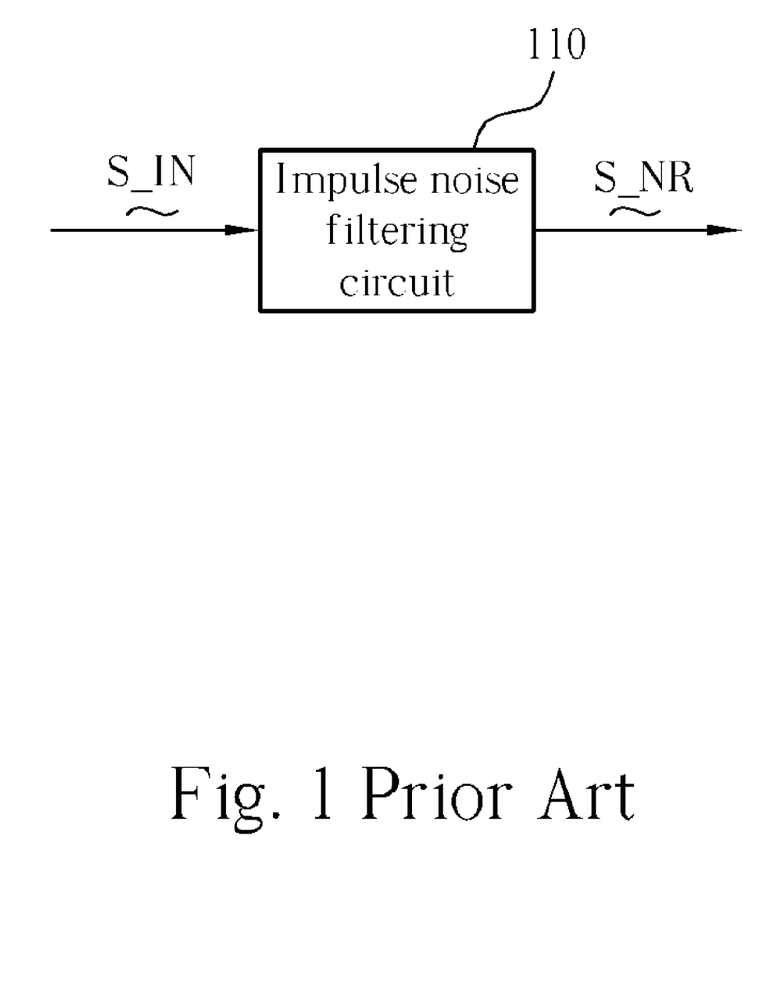
FIG. 1 is a block diagram of a conventional impulse noise filtering device.

Please refer to FIG. 1. FIG. 1 is a block diagram of a conventional impulse noise filtering device. The impulse noise filtering circuit 110 receives an image signal S_IN, which includes a plurality of image frames. The impulse noise filtering circuit 110 determines a specific image frame by utilizing a window. If the luminance of a certain pixel of the window is bigger (or less) than the luminance of other pixels of the window, the impulse noise filtering circuit 110 will record the location of the biggest (or least) pixel and records the luminance value of the biggest (or least) pixel. Then the impulse noise filtering circuit 110 further determines the pixel with sub-biggest (or sub-least) luminance and records the luminance value of the sub-biggest (or sub-least) pixel, then utilizes the luminance value of the sub-biggest (or sub-least) pixel to replace the original luminance value of the biggest (or least) pixel. However, the related art reducing impulse noise method is too simple and not able to correctly determine if the pixel having the biggest (or the least) luminance is impulse noise. Moreover, the method for utilizing the luminance value of the sub-biggest (or sub-least) pixel to replace the original luminance value of the biggest (or least) pixel will cause decrease the image quality. The drawbacks and limitations of the conventional methods regarding said luminance are well known to those having average skill in this art and therefore further details are omitted for the sake of brevity.

It is apparent that new methods and devices are required.

SUMMARY OF THE INVENTION

It is therefore one of the objectives of the claimed invention to provide a device and a method for reducing impulse noise of an image signal for solving the above-mentioned problems.

According to an aspect of the present invention, an impulse noise filtering device is disclosed. The device includes a signal intensity detector, an intensity difference calculator, and a filtering circuit. The signal intensity detector receives an image signal and determines a first pixel having an extreme intensity, and a second pixel having a second extreme intensity of a window of the image frame corresponding to the image signal. The intensity difference calculator determines the intensity difference between the first pixel and the second pixel. The filtering circuit receives the image signal and optionally filters the image signal for reducing the impulse noise according to the intensity difference between the first pixel and the second pixel. According to other aspects of the present invention, the impulse noise filtering device may further comprises at least one or a certain combination of an edge detector, a low-pass filter and a pixel difference detector. The edge detector determines the edge information $E_P$ of the image frame, the pixel difference detector determines the difference value of the signal intensity of all pixels of the window, and the low-pass filter filters the image signal and outputs the filtered image signal to the pixel difference detector for improving the accuracy of the pixel difference detector. At least one of the edge information and the difference value assists the filtering circuit in optionally filtering the image signal for reducing the impulse noise, while the intensity difference between the first pixel and the second pixel may be referred or ignored by the filtering circuit.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, consumer electronic equipment manufacturers may refer to a component by different names. This document does not intend to distinguish between components that differ in name but not function.

Figure 2:
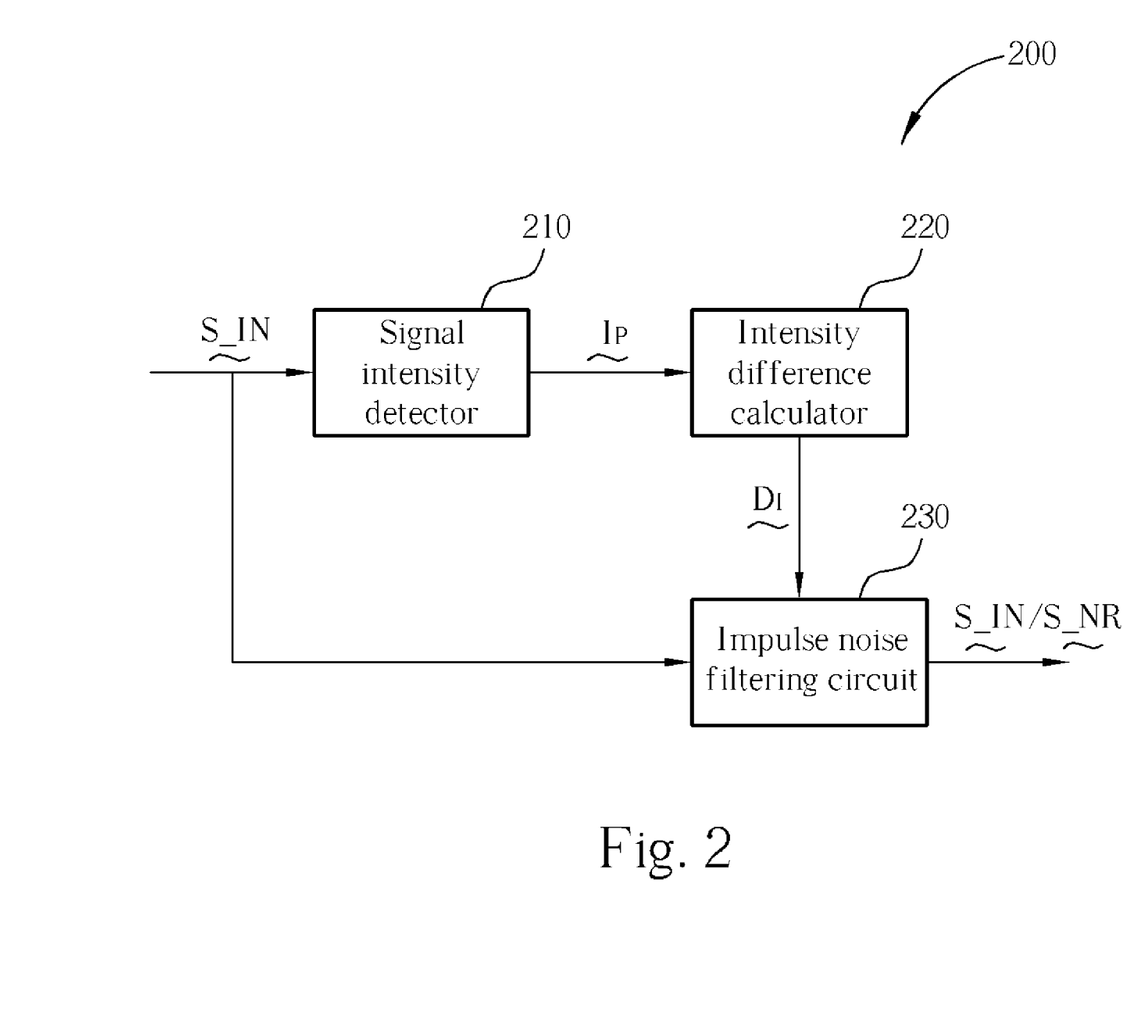
FIG. 2 is a block diagram of an impulse noise filtering device according to a first embodiment of the present invention.

Please refer to FIG. 2. FIG. 2 is a block diagram of an impulse noise filtering device according to a first embodiment of the present invention. The impulse noise filtering device 200 includes a signal intensity detector 210, an intensity difference calculator 220, and an impulse noise filtering circuit 230. The signal intensity detector 210 receives the image signal S_IN which comprises a plurality of image frames, and then determines a first pixel having an extreme intensity (i.e. maximum or minimum intensity) and a second pixel having a second extreme intensity (i.e. sub-maximum or sub-minimum intensity) from all pixels of a window of a specifically image frame. The signal intensity can be the luminance or chrominance of the pixel. The signal intensity detector 210 then sends the signal intensity information $I_P$ to the intensity difference calculator 220. The intensity difference calculator 220 determines the intensity difference value $D_I$ between the first pixel and the second pixel. The impulse noise filtering circuit 230 decides whether filtering of the image signal S_IN is necessary or not according to the intensity difference value $D_I$. If the intensity difference value $D_I$ is bigger, this means that the intensity difference between the first pixel and the second pixel is bigger, that is, namely the possibility of the first pixel suffering from interference by the impulse noise is higher. In this case, the impulse noise filtering circuit 230 will filter the image signal S_IN and generates the filtered signal S_NR. However, if the intensity difference value $D_I$ is less, it means that the intensity difference between the first pixel and the second pixel is less, that is, namely the possibility of the first pixel suffering from interference from the impulse noise is lower. In this case, the impulse noise filtering circuit 230 will directly output the image signal S_IN without filtering the signal S_IN. In this exemplary embodiment, the filtering method of the impulse noise filtering circuit 230 is by way of arithmetically averages of the image intensity of all pixels except for the first pixel of the window, and then utilizes the average value to replace the original signal intensity of the first pixel.

Figure 3:
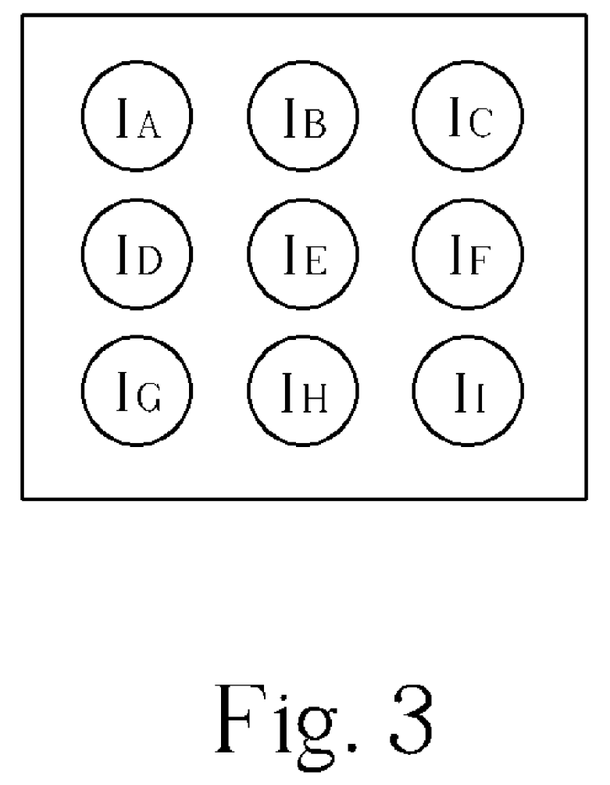
FIG. 3 is a schematic diagram of the window applied in the impulse noise filtering device.

Please refer to FIG. 3. FIG. 3 is a schematic diagram of the window applied in the impulse noise filtering device 200. The signal intensity of the nine pixels in the window respectively are $I_A, I_B, \ldots, I_I$. Assuming that the $I_E$ is an extreme intensity, the filtered signal intensity $I_E'$ can be expressed as follows:

$$I_E' = (I_A + I_B + I_C + I_D + I_F + I_G + I_H + I_I)/8 \qquad \text{Formula (1)}$$

The above-mentioned filtering method is not limited to this prefer invention, other filtering methods are compatible with the present invention also can be implemented by a personal having ordinary skill in the art. For example, separately assigning the weighed value to the nine pixels of the window respectively, then multiplying the signal intensity of the nine pixels by the corresponding weighted value, averaging the result, and utilizing the weighted average resulting value to replace the original signal intensity of the first pixel. May other examples are compatible and within the scope of the present invention.

Figure 4:
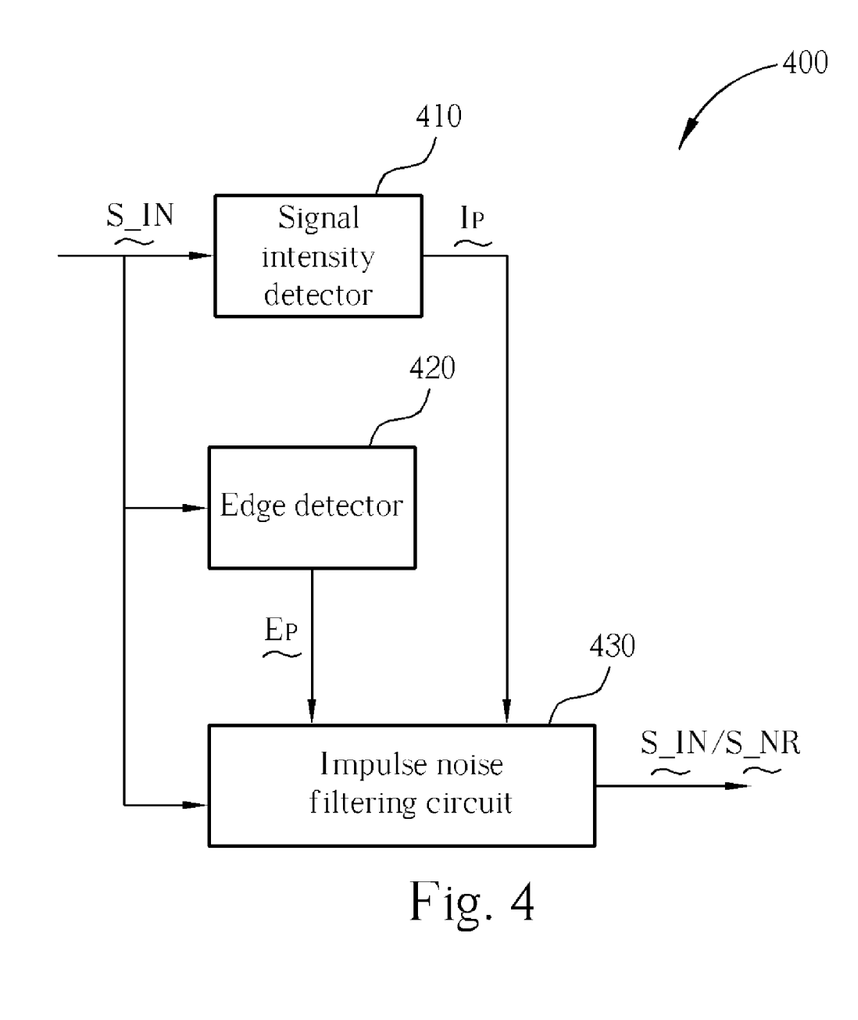
FIG. 4 is a block diagram of the impulse noise filtering device according to a second embodiment of the present invention.

Please refer to FIG. 4. FIG. 4 is a block diagram of the impulse noise filtering device according to a second embodiment of the present invention. The impulse noise filtering device 400 includes a signal intensity detector 410, an edge detector 420, and an impulse noise filtering circuit 430. The function of the signal intensity detector 410 and the signal intensity detector 210 are the same, therefore the details are omitted hereinafter for the sake of brevity. The edge detector 420 is utilized for determining the edge information $E_P$ of the target image frame of the image signal S_IN. The edge information $E_P$ is utilized for indicating if the present frame detected from the window is a smooth area. If a smooth area is detected, the pixel having an extreme intensity, as determined by the signal intensity detector 410, has a higher possibility of being affected by (i.e., interfered with) as previously detailed earlier in the present disclosure. However, if the present frame detected from the window is not a smooth area, it means that the pixel having an extreme intensity, as determined by the signal intensity detector 410, is possibly located on the edge of the frame and in fact does not have a higher possibility of being interfered by the impulse noise. Next, the impulse noise filtering circuit 430 determines whether filtering of the image signal S_IN according to the signal intensity information $I_P$ and the edge information $I_P$ is necessary. For example, when the signal intensity information $I_P$ indicates that the frame detected from the window is a smooth area, the impulse noise filtering circuit 430 then filters the image signal S_IN; otherwise, the impulse noise filtering circuit 430 will output the image signal S_IN directly and without having performed any filtering operation. The filtering method of the impulse noise filtering circuit 430 and the impulse noise filtering circuit 230 are the same, therefore the details are omitted hereinafter for the sake of brevity.

Figure 5A:
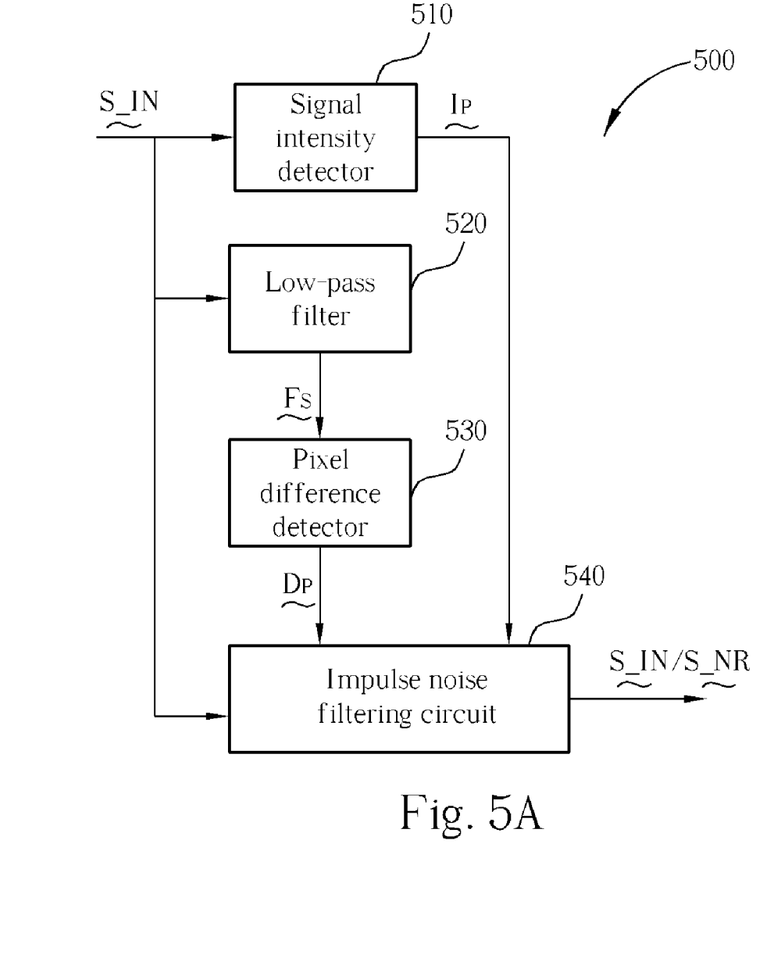
FIG. 5A is a block diagram of the impulse noise filtering device according to a third embodiment of the present invention.

Please refer to FIG. 5A. FIG. 5A is a block diagram of the impulse noise filtering device according to a third embodiment of the present invention. The impulse noise filtering device 500 includes a signal intensity detector 510, a low-pass filter 520, a pixel difference detector 530, and an impulse noise filtering circuit 540. The function of the signal intensity detector 510 and the signal intensity detectors 210, 410 are the same, therefore the details are omitted hereinafter for the sake of brevity. The pixel difference detector 530 determines the difference value of the signal intensity of all pixels of the window for outputting a pixel difference information $D_P$. In this case if the signal intensity difference between a certain pixel, or some certain pixels, and other pixels is very high, the possibility of impulse noise existing is higher. On the other hand, if the signal intensity difference of all pixels of the window is not high, the possibility of impulse noise existing is lower. In order to improve the accuracy of the pixel difference detector 530, the image signal S_IN is firstly filtered by the low-pass filter 520 before being utilized by the pixel difference detector 530 for decreasing the signal differences of all of the pixels. Then, the low-pass filter 520 sends the filtered signal $F_S$ to the pixel difference detector 530. In this case, if the pixel difference detector 530 still determines that the signal intensity difference between a certain pixel, or some certain pixels, and other pixels is high, the accuracy of determining the possibility of impulse noise existing is greatly improved. Next, the impulse noise filtering circuit 540 determines whether filtering the image signal S_IN according to the signal intensity information $I_P$ and the pixel difference information $D_P$ is necessary. The filtering method of the impulse noise filtering circuit 540 and the impulse noise filtering circuit 230, 430 are the same; therefore, the details are omitted hereinafter for the sake of brevity.

Figure 5B:
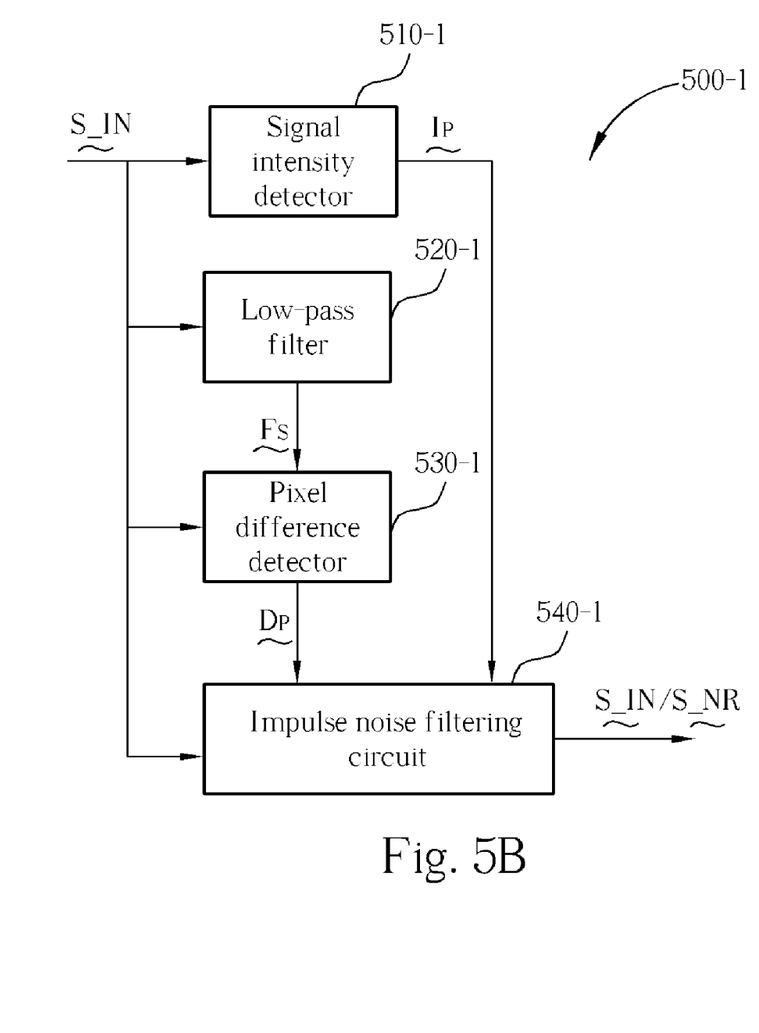
FIG. 5B is a block diagram of the impulse noise filtering device according to a fourth embodiment of the present invention.

Please refer to FIG. 5B. FIG. 5B is a block diagram of the impulse noise filtering device according to a fourth embodiment of the present invention. In this exemplary embodiment, the impulse noise filtering device 500-1 includes a signal intensity detector 510-1, a low-pass filter 520-1, a pixel difference detector 530-1, and an impulse noise filtering circuit 540-1. The primary difference between the embodiments shown in FIGS. 5A and 5B is that the pixel difference detector 530-1 detects the filtered signal $F_S$ and the image signal S_IN for generating a detection result, and further outputs a pixel difference information $D_P$ according the detection result. Lastly, the impulse noise filtering circuit 540-1 determines whether filtering of the input signal S_IN is necessary according to the pixel difference information $D_P$ and the signal intensity information $I_P$.

Figure 5C:
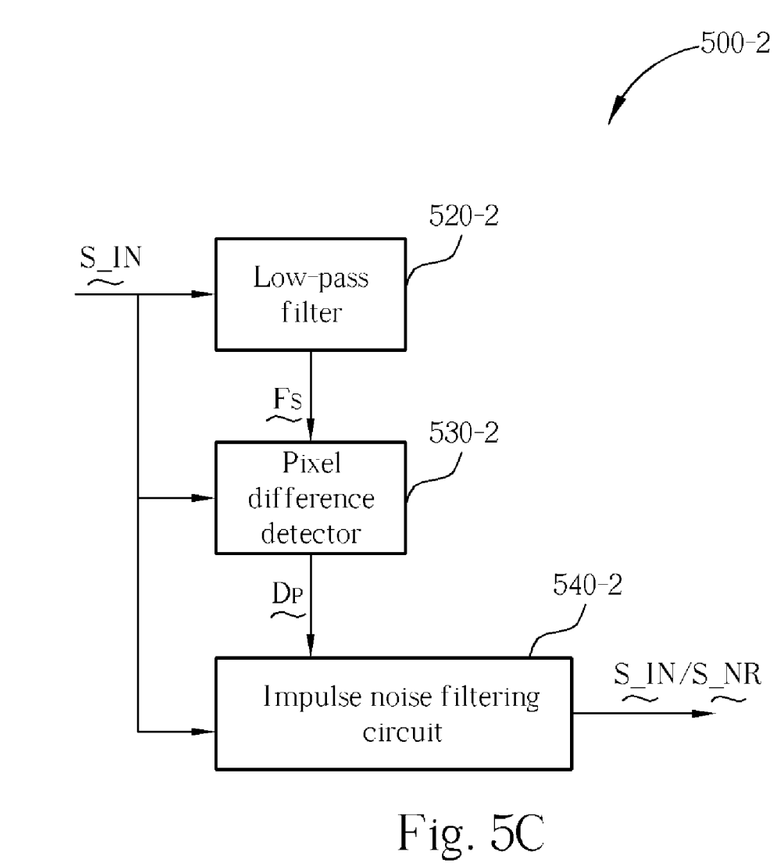
FIG. 5C is a block diagram of the impulse noise filtering device according to a fifth embodiment of the present invention.

Please refer to FIG. 5C. FIG. 5C is a block diagram of the impulse noise filtering device according to a fifth embodiment of the present invention. In this exemplary embodiment, the impulse noise filtering device 500-2 includes a low-pass filter 520-2, a pixel difference detector 530-2 and an impulse noise filtering circuit 540-2. The primary difference between this embodiment shown in FIG. 5C and the previous embodiment shown in FIG. 5B is that the impulse noise filtering circuit 540-2 determines whether filtering of the input signal S_IN is necessary only according to the pixel difference information $D_P$ outputted by the pixel difference detector 530.

Figure 6:
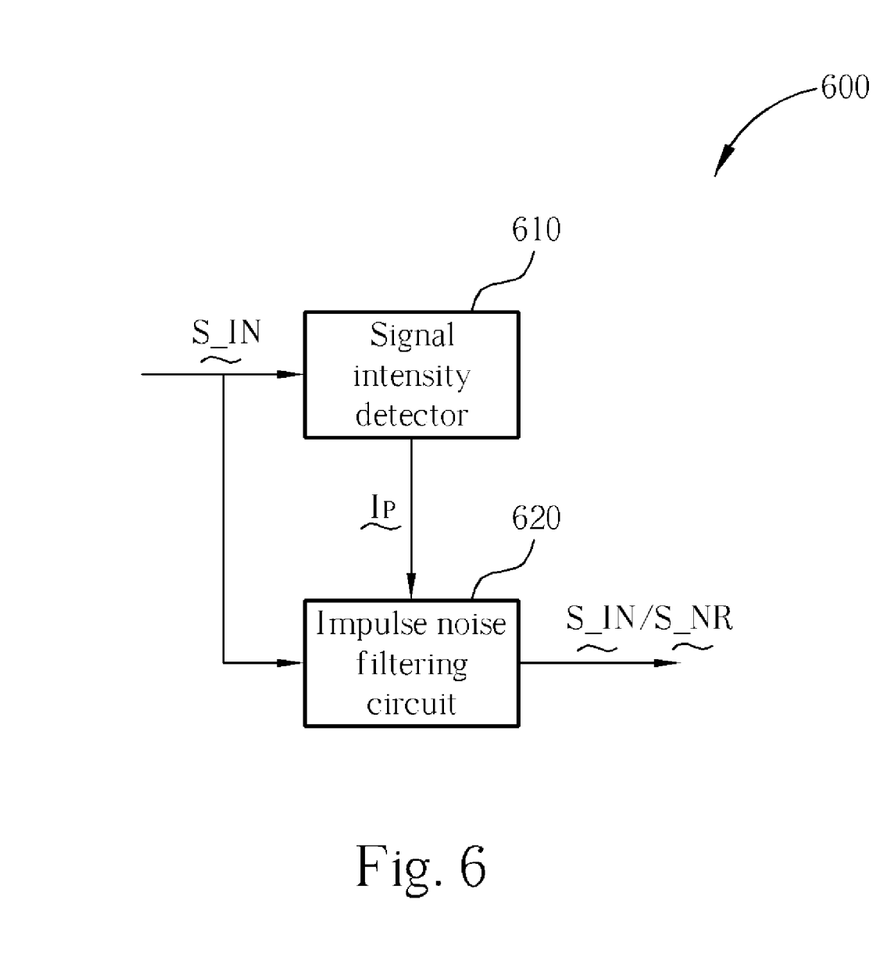
FIG. 6 is a block diagram of the impulse noise filtering device according to a sixth embodiment of the present invention.

Please refer to FIG. 6. FIG. 6 is a block diagram of the impulse noise filtering device according to a sixth embodiment of the present invention. The impulse noise filtering device 600 includes a signal intensity detector 610 and an impulse noise filtering circuit 620. The function of the signal intensity detector 610 and the signal intensity detectors 210, 410, and 510 are the same; therefore, the details are omitted hereinafter for the sake of brevity. One of the characteristics of the impulse noise filtering device 600 is that the impulse noise filtering device 600 arithmetically averages the image intensity of all pixels except for the first pixel of the window, then the impulse noise filtering device 600 utilizes the average value for replacing the original signal intensity of the first pixel. Therefore, in contrast to the related art of directly utilizing the signal intensity of the pixel having the second most extreme signal intensity to replace the signal intensity of the pixel having the extreme signal intensity. Thereby, the present invention avoids the non-continuity problem regarding the filtered image more efficiently than the prior art. Moreover, the impulse noise filtering device 600 determines whether filtering the image signal S_IN according to the signal intensity information $I_P$ outputted by the signal intensity detector 610 is necessary.

Figure 7:
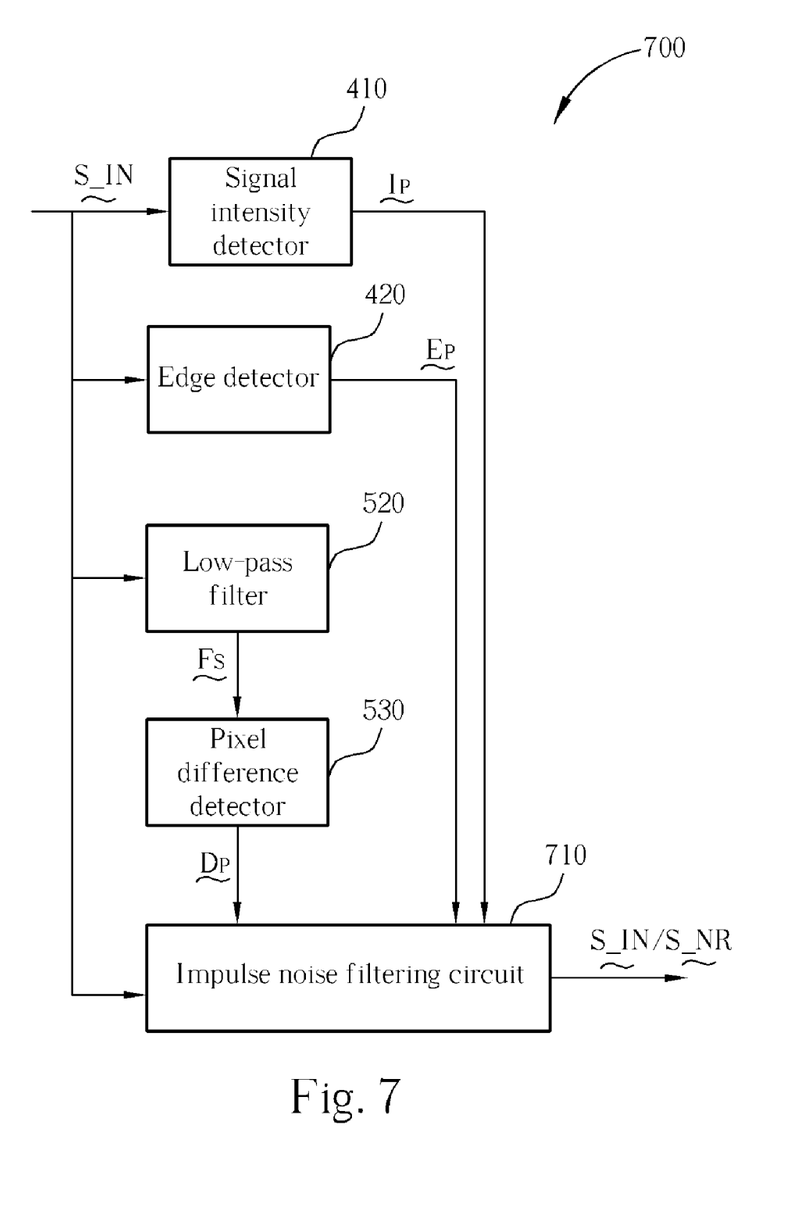
FIG. 7 is a block diagram of the impulse noise filtering device according to a seventh embodiment of the present invention.

Additionally, an impulse noise filtering device with better efficiency can be generated by combining the above-mentioned embodiments. Please refer to FIG. 7. FIG. 7 is a block diagram of the impulse noise filtering device according to a seventh embodiment of the present invention. The seventh embodiment is composed of the second embodiment shown in FIG. 4 and the third embodiment shown in FIG. 5A in combination with one another. The impulse noise filtering device 700 includes the signal intensity detector 410, the edge detector 420, the low-pass filter 520, the pixel difference detector 530, and an impulse noise filtering circuit 710. The impulse noise filtering circuit 710 determines whether filtering the image signal S_IN according to the signal intensity information $I_P$, the edge information $E_P$ and the pixel difference information $D_P$ are necessary.

Figure 8:
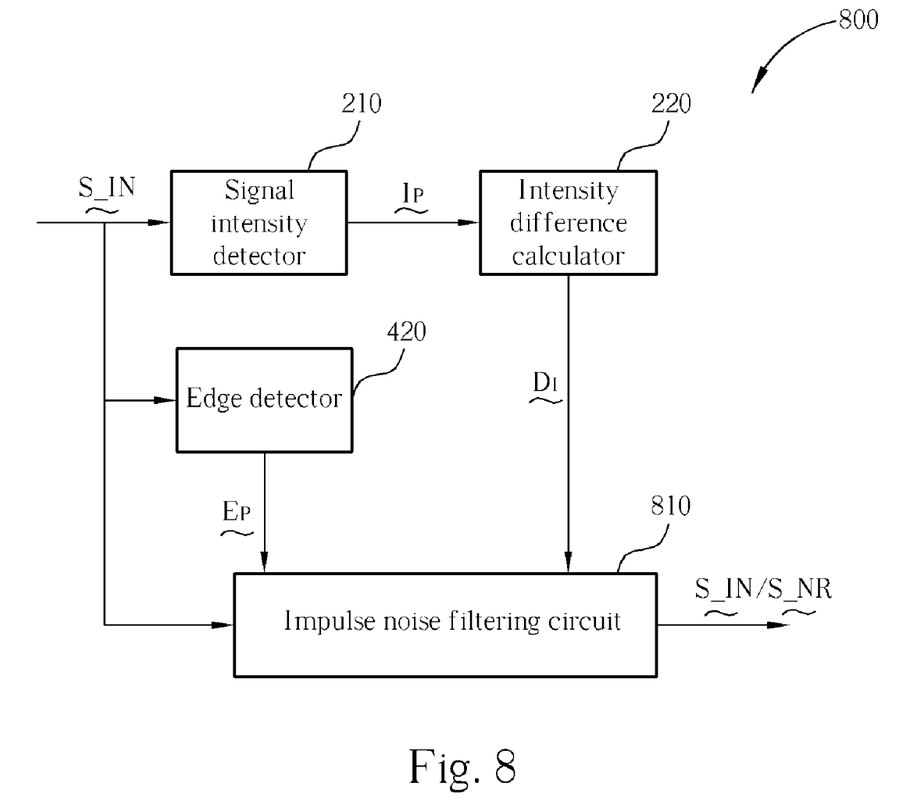
FIG. 8 is a block diagram of the impulse noise filtering device according to an eighth embodiment of the present invention.

Please refer to FIG. 8. FIG. 8 is a block diagram of the impulse noise filtering device according to an eighth embodiment of the present invention. The eight embodiment is composed of the first embodiment shown in FIG. 2 and the second embodiment shown in FIG. 4 in combination with one another. The impulse noise filtering device 800 includes the signal intensity detector 210, the intensity difference calculator 220, the edge detector 420, and an impulse noise filtering circuit 810. The impulse noise filtering circuit 810 determines whether filtering the image signal S_IN according to the signal intensity difference value $D_I$ and the edge information $E_P$ is necessary.

Figure 9:
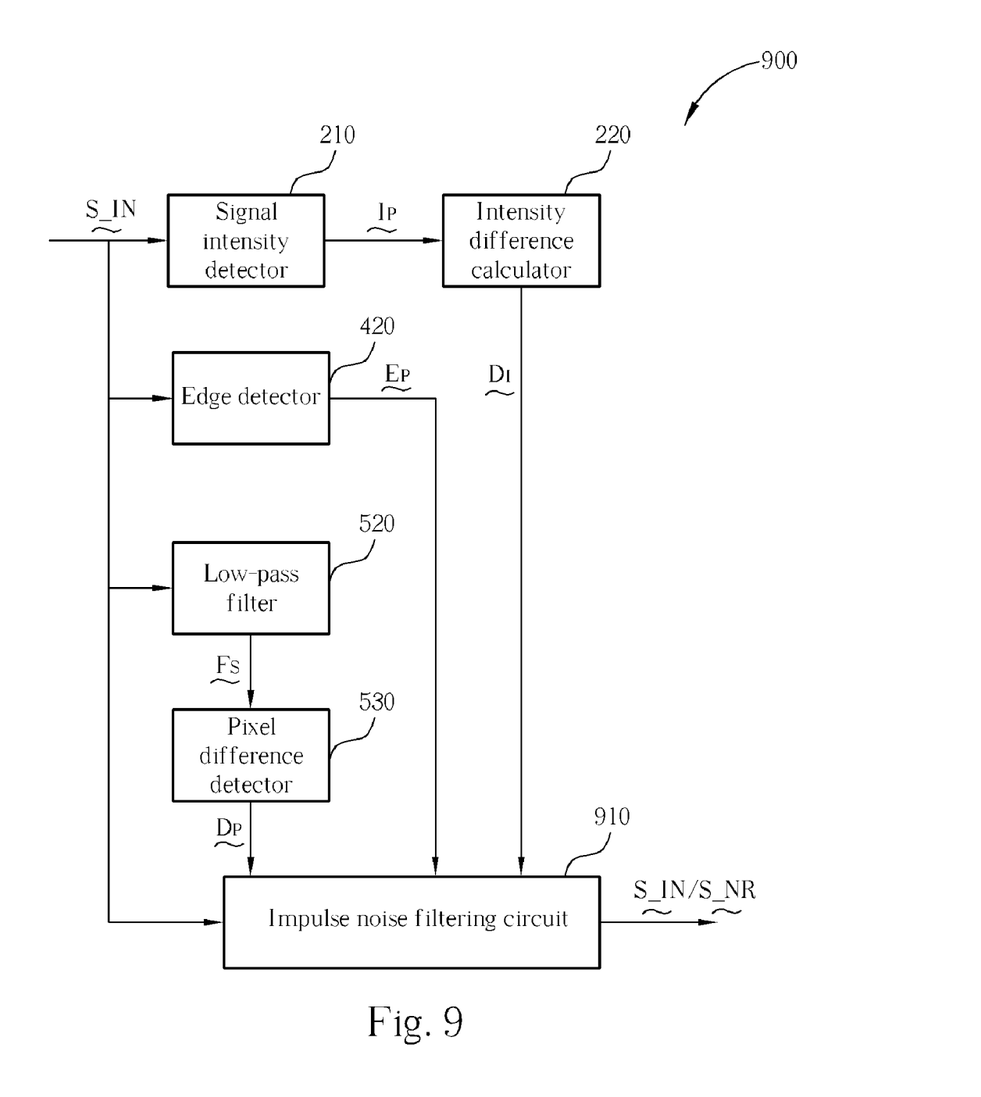
FIG. 9 is a block diagram of the impulse noise filtering device according to a ninth embodiment of the present invention.

Please refer to FIG. 9. FIG. 9 is a block diagram of the impulse noise filtering device according to a ninth embodiment of the present invention. The ninth embodiment is composed of the eighth embodiment shown in FIG. 8 and the third embodiment shown in FIG. 5A in combination with one another. The impulse noise filtering device 900 includes the signal intensity detector 210, the intensity difference calculator 220, the edge detector 420, the low-pass filter 520, the pixel difference detector 530, and an impulse noise filtering circuit 910. The impulse noise filtering circuit 910 determines whether filtering the image signal S_IN according to the signal intensity difference value $D_I$, the edge information $E_P$, and the pixel difference information $D_P$ is necessary.

Figure 10:
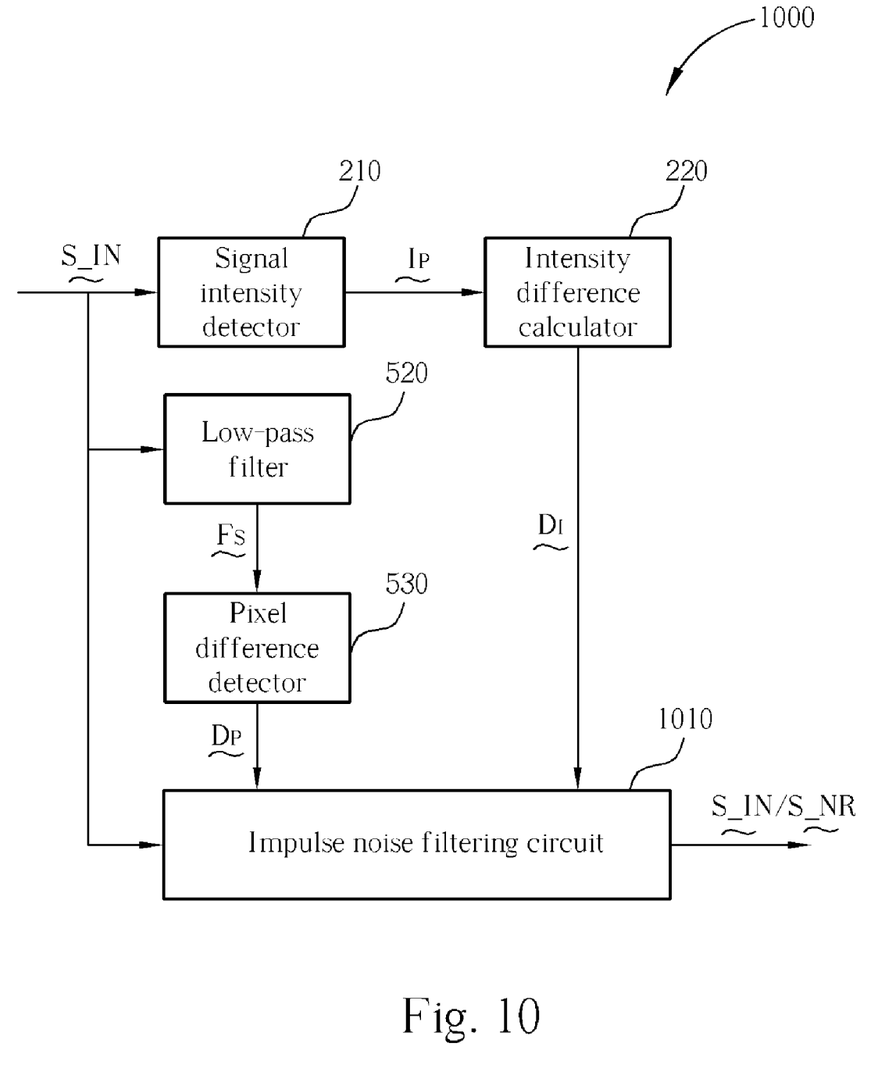
FIG. 10 is a block diagram of the impulse noise filtering device according to a tenth embodiment of the present invention.

Please refer to FIG. 10. FIG. 10 is a block diagram of the impulse noise filtering device according to a tenth embodiment of the present invention. The tenth embodiment is composed of the first embodiment shown in FIG. 2 and the third embodiment shown in FIG. 5A in combination with one another. The impulse noise filtering device 1000 includes the signal intensity detector 210, the intensity difference calculator 220, the low-pass filter 520, the pixel difference detector 530, and an impulse noise filtering circuit 1010. The impulse noise filtering circuit 1010 determines whether filtering the image signal S_IN according to the signal intensity difference value $D_I$ and the pixel difference information $D_P$ is necessary.

In summary, the impulse noise filtering device of the present invention adds the detector and the calculator to carefully and precisely determine whether impulse noise occurred in the image frame thereby reducing erroneous judgment (i.e., filtering only when filtering is needed). Moreover, in contrast to the related art, the filtering mechanism of the present invention avoids the problem of the non-continuous image that can otherwise occur after and as a result of the filtering of the image frame.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An impulse noise filtering device, comprising:
    a signal intensity detector, for receiving an image signal and determining a first pixel having an extreme intensity, and
    a second pixel having a second extreme intensity for a plurality of pixels of a window of an image frame corresponding to the image signal;
    an intensity difference calculator, coupled to the signal intensity detector, for determining the intensity difference between the first pixel and the second pixel; and
    a filtering circuit, coupled to the intensity difference calculator, for receiving the image signal and filtering the image signal to reduce the impulse noise at the first pixel responsive to the intensity difference between the first pixel and the second pixel being greater than a designated value.

2. The impulse noise filtering device of claim 1, wherein the signal intensity of the first pixel and the second pixel are the luminance or chrominance of the first pixel and the second pixel.

3. The impulse noise filtering device of claim 1, wherein the filtering circuit arithmetically or weighted averages the signal intensity of all pixels of the window except for the first pixel to generate an average value, and utilizes the average value for replacing the original signal intensity of the first pixel to achieve the filtering process.

4. The impulse noise filtering device of claim 1, further comprising:
    an edge detection circuit, for receiving the image signal, and detecting the image frame corresponding to the image signal to determine an edge information of the image frame;
    wherein the filtering circuit is further coupled to the edge detection circuit, for receiving the edge information and bypassing filtering the image signal, the bypassing responsive to the edge information indicating that the first pixel is located on an edge of the image frame.

5. The impulse noise filtering device of claim 4, further comprising:
   a pixel difference detector, for receiving the image signal and detecting the intensity difference of a plurality of pixels of the window to generate a pixel difference information;
   wherein the filtering circuit is further coupled to the pixel difference detector, for receiving the pixel difference information and bypassing filtering the image signal responsive to the edge information indicating that the first pixel is located on an edge of the image frame or responsive to the pixel difference information indicating that the intensity difference of each of the plurality of pixels of the window is less than a second designated value.

6. The impulse noise filtering device of claim 5, further comprising:
   a low-pass filter, coupled to the pixel difference detector, for executing a low-pass filtering process to the image signal before the pixel difference detector detects the intensity difference of the pixels.

7. The impulse noise filtering device of claim 1, further comprising:
   a pixel difference detector, for receiving the image signal and detecting the intensity difference of a plurality of pixels of the window to generate a pixel difference information;
   wherein the filtering circuit is further coupled to the pixel difference detector, for receiving the pixel difference information and bypassing filtering the image signal responsive to the pixel difference information indicating that the intensity difference of each of the plurality of pixels of the window is less than a second designated value.

8. The impulse noise filtering device of claim 7, further comprising:
   a low-pass filter, coupled to the pixel difference detector, for executing a low-pass filtering process to the image signal before the pixel difference detector detects the intensity difference of the pixels.

9. An impulse noise filtering device, comprising:
   a signal intensity detector, for receiving an image signal and determining a first pixel having an extreme intensity for a plurality of pixels of a window of an image frame corresponding to the image signal;
   an intensity difference calculator, coupled to the signal intensity detector, for determining the intensity difference between the first pixel and a second pixel; and
   a filtering circuit, coupled to the intensity difference calculator, for receiving the image signal and filtering the image signal to reduce the impulse noise at the first pixel responsive to the intensity difference between the first pixel and the second pixel being greater than a designated value.

10. The impulse noise filtering device of claim 9, wherein the signal intensity of the first pixel is the luminance or chrominance of the first pixel.

11. The impulse noise filtering device of claim 9, wherein the filtering circuit arithmetically or weighted averages the signal intensity of all pixels except for the first pixel of the window to generate an average value, and utilizes the average value for replacing the original signal intensity of the first pixel to achieve the filtering process.

12. The impulse noise filtering device of claim 9, further comprising:
   a pixel difference detector, for receiving the image signal and detecting the intensity difference of a plurality of pixels of the window to generate a pixel difference information;
   wherein the filtering circuit is further coupled to the pixel difference detector, for receiving the pixel difference information and bypassing filtering the image signal responsive to the pixel difference information indicating that the intensity difference of each of the plurality of pixels of the window is less than a second designated value.

13. The impulse noise filtering device of claim 12, further comprising:
   a low-pass filter, coupled to the pixel difference detector, for executing a low-pass filtering process to the image signal before the pixel difference detector detects the intensity difference of the pixels.

14. An impulse noise filtering device, comprising:
   a signal intensity detector, for receiving an image signal and determining a first pixel having an extreme intensity for a plurality of pixels of a window of an image frame corresponding to the image signal;
   a pixel difference detector, for receiving the image signal and detecting an intensity difference of a plurality of pixels of the window to generate a pixel difference information; and
   a filtering circuit, coupled to the signal intensity detector and the pixel difference detector, for receiving the image signal and filtering the image signal to reduce the impulse noise at the first pixel responsive to the pixel difference information indicating that the intensity difference of at least one of the plurality of pixels of the window is more than a designated value, wherein the filtering circuit bypasses filtering the image signal responsive to the pixel difference information indicating that the intensity difference of each of the plurality of pixels of the window is less than the designated value.

15. The impulse noise filtering device of claim 14, further comprising:
   a low-pass filter, coupled between the image signal and the pixel difference detector, for executing a low-pass filtering process to the image signal, and outputting the filtered image signal to the pixel difference detector.

16. The impulse noise filtering device of claim 14, wherein the signal intensity of the first pixel is the luminance or chrominance of the first pixel.

17. The impulse noise filtering device of claim 14, wherein the filtering circuit arithmetically or weighted averages the signal intensity of all pixels except for the first pixel of the window to generate an average value, and utilizes the average value for replacing the original signal intensity of the first pixel to achieve the filtering process.

18. An impulse noise filtering device, comprising:
   a low-pass filter, for receiving an image signal and executing a low-pass filtering process to the image signal;
   a pixel difference detector, for receiving the filtered image signal and detecting an intensity difference of a plurality of pixels of a window to generate a pixel difference information; and
   a filtering circuit, coupled to the pixel difference detector, for receiving the image signal and filtering the image signal to reduce the impulse noise responsive to the pixel difference information indicating that the intensity difference of at least one of the plurality of pixels of the window is more than a designated value, wherein the filtering circuit bypasses filtering the image signal responsive to the pixel difference information indicating that the intensity difference of each of the plurality of pixels is less than the designated value.

19. The impulse noise filtering device of claim 18, further comprising:

a signal intensity detector, for receiving the image signal and determining a first pixel having an extreme intensity of the window of the image frame corresponding to the image signal;

wherein the filtering circuit filters the image signal for reducing the impulse noise at the first pixel according to the intensity difference between the first pixel and second pixel of the window.

20. The impulse noise filtering device of claim 19, wherein the signal intensity of the first pixel is the luminance or chrominance of the first pixel.

21. The impulse noise filtering device of claim 19, wherein the filtering circuit arithmetically or weighted averages the signal intensity of all pixels except for the first pixel of the window to generate an average value, and utilizes the average value for replacing the original signal intensity of the first pixel to achieve the filtering process.

* * * * *